United States Patent [19]

Eliassen et al.

[11] 4,237,265

[45] Dec. 2, 1980

[54] PROCESS FOR CATALYST REMOVAL FROM POLYPHENYLENE ETHER REACTION SOLUTIONS

[75] Inventors: John D. Eliassen, Norwalk, Conn.; Gim F. Lee, Jr., Albany; James Watson, Jr., New City, both of N.Y.

[73] Assignee: General Electric Company, Pittsfield, Mass.

[21] Appl. No.: 611,266

[22] Filed: Sep. 8, 1975

[51] Int. Cl.³ .............................................. C08G 65/46
[52] U.S. Cl. .................................... 528/496; 528/212; 528/486; 528/487; 528/490; 528/499; 528/502
[58] Field of Search ................... 260/47 ET; 528/496, 528/486, 487, 490, 499, 502, 212

[56] References Cited

U.S. PATENT DOCUMENTS

| | | | |
|---|---|---|---|
| 3,630,995 | 12/1971 | Modan | 260/47 ET |
| 3,733,301 | 5/1973 | Modan | 260/47 ET |
| 3,783,147 | 1/1974 | Calicchia et al. | 260/47 ET |
| 3,923,738 | 12/1975 | Van Sorge | 260/47 ET |

*Primary Examiner*—Lester L. Lee
*Attorney, Agent, or Firm*—Morgan, Finnegan, Pine, Foley & Lee

[57] ABSTRACT

An improved process is disclosed which is useful in separating the catalyst residue from a polyphenylene ether reaction solution. The process is based on the use of an extracting agent in a liquid-liquid extraction process wherein the aqueous extraction phase is maintained in a continuous phase while the organic phase is maintained as a discrete phase.

11 Claims, 2 Drawing Figures

PROCESS FOR CATALYST REMOVAL FROM POLYPHENYLENE ETHER REACTION SOLUTIONS

This invention provides an improved process which is useful in separating the catalyst from a polyphenylene ether reaction solution. The process is based on the use of an extracting agent in a liquid-liquid extraction process wherein the aqueous extraction phase is maintained in a continuous phase while the organic phase is maintained as a discrete phase.

BACKGROUND OF THE INVENTION

The polyphenylene ethers and processes for their preparation are well known in the art. They are described in Hay, U.S. Pat. No. 3,306,874 and U.S. Pat. No. 3,306,875 and Blanchard et al, U.S. Pat. No. 3,219,625 and U.S. Pat. No. 3,219,626 all of which are incorporated by reference. Other patents which show the preparation of polyphenylene ethers include Price et at, U.S. Pat. No. 3,382,212; Kobayashi et al, U.S. Pat. No. 3,455,880; Bennett and Cooper, U.S. Pat. No. 3,796,698; Bennett and Katchman, U.S. Pat. No. 3,787,362; Cooper, U.S. Pat. No. 3,733,307; Cooper and Bennett, U.S. Pat. No. 3,733,299, all of which are incorporated by reference.

The processes most generally used to produce the polyphenylene ethers involve the self-condensation of a monovalent phenol in the presence of an oxygen-containing gas and a catalyst comprising a metal-amine complex.

These processes are carried out in the presence of an organic solvent and the reaction is usually terminated by removal of the catalyst from the reaction mixture. This has been carried out by extraction with mineral acids such as hydrochloric or sulfuric acid.

Extraction with organic acids such as acetic acid has also been used. This procedure also gives good copper removal and extracts both copper and amine into the aqueous phase. A separate step (neutralization and distillation) is required to recover the amine; this is also true for extraction with mineral acid. Also, bisulfates, ammonium salts and chelating agents such as EDTA, triethylene tetraamine, etc., have been employed for this purpose.

Aqueous extraction has been carried out in such a manner that the aqueous extracting fluid has been dispersed throughout the organic phase which comprises the polyphenylene ether, the reaction solvent and the copper amine catalyst. Because of the very fine dispersion of the aqueous phase in a high viscosity organic phase and because of the inter-phase surface tension of the dispersed aqueous extractant, the different phases do not readily phase separate on standing; and a portion of the aqueous phase remains within the organic phase. Thereafter, when an antisolvent is added to the mixture, the polyphenylene ether precipitates and the catalyst residue is taken up by the antisolvent. When the antisolvent is passed through a recovery system, the catalyst residue is difficult to separate and causes the equipment to become fouled. This problem makes it desirable to remove the catalyst residue from the antisolvent prior to passing it through the recovery system. This can be done using absorbents and evaporative techniques but these procedures are quite costly.

It has now been found that the problem of catalyst residues in the antisolvent may be overcome by varying the conventional liquid-liquid extraction process so that a continuous aqueous phase is always maintained while a discrete organic phase is maintained. The result of this process is the substantially complete removal of the copper-amine catalyst residue from the polyphenylene ether reaction solution so that the copper-amine catalyst is not carried into the antisolvent that is used to separate the polyphenylene ether resin from its reaction solvent.

Accordingly, it is a primary object of this invention to provide an improved liquid-liquid extraction process for the separation of a copper-amine catalyst from a polyphenylene ether reaction mixture which does not result in the entrapment of the aqueous extracting liquid in the organic phase which contains the polyphenylene ether.

It is also an object of this invention to provide a rapid method of separating a copper-amine catalyst from a polyphenylene ether reaction mixture.

DETAILED DESCRIPTION OF THE INVENTION

Figure 1:
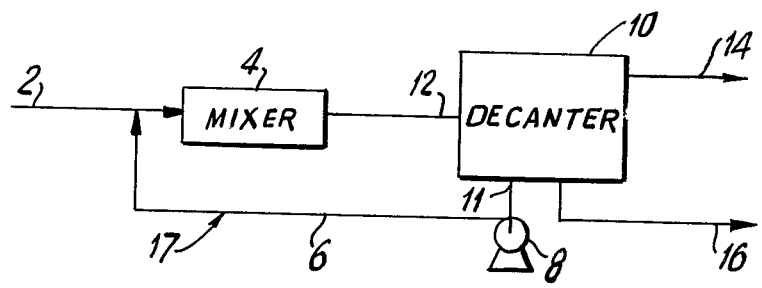
FIG. 1 is a diagram of an apparatus for carrying out the process of the invention in a continuous manner with a recycle of the aqueous extracting liquid that contains the extracted catalyst residue.

This invention provides an improved process for the separation of a copper-amine catalyst from a polyphenylene ether resin organic reaction solution, wherein a catalyst extracting agent is added to said polyphenylene ether organic reaction solution to form a mixture that includes polyphenylene ether resin, organic solvent and extractable copper-amine catalyst. The improvement comprises extracting said mixture that includes polyphenylene ether resin, organic solvent and extractable copper-amine catalyst with an aqueous liquid extractant by cocurrent or countercurrent liquid-liquid extraction in an extractor in such a manner that a continuous aqueous phase is maintained and a discrete organic phase containing polyphenylene ether resin is contacted by said continuous aqueous phase. Thereafter, there is withdrawn from the upper part of said extractor, an organic phase containing a polyphenylene ether resin that is substantially free of copper-amine catalyst. The polyphenylene ether resin is then separated from the organic phase containing polyphenylene ether resin substantially free of copper-amine catalyst.

The preferred polyphenylene ether resins are of the formula:

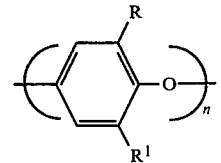

wherein the oxygen ether atom of one unit is connected to the benzene nucleus of the next adjoining unit, n is an integer of at least 50; and R and $R^1$ are monovalent substituents selected from hydrogen, halogen, hydrocarbon radicals, halohydrocarbon radicals having at least two carbon atoms between the halogen atoms and the phenyl nucleus, hydrocarbonoxy and halohydrocarbonoxy radicals having at least two carbon atoms, between the halogen atom and the phenyl nucleus.

The preferred polyphenylene ether resin is poly (2,6-dimethyl-1,4-phenylene ether) resin.

Many diverse extractants may be used in the practice of the invention. For example, sulfuric acid, acetic acid, ammonium salts, bisulfate salts and various chelating agents may be used. When these materials are added to a polyphenylene ether reaction solution, the copper-amine catalyst becomes poisoned and further oxidation does not take place. Many different materials may be used but it is preferred to employ those chelating agents that are disclosed in U.S. Pat. No. 3,838,102 which is hereby incorporated by reference.

The useful chelating agents include polyfunctional carboxylic acid containing compounds such as sodium potassium tartrate, nitrilotriacetic acid, citric acid, glycine and especially preferably they will be selected from polyalkylenepolyamine polycarboxylic acids, aminopolycarboxylic acids, aminocarboxylic acids, polycarboxylic acids and their alkali metal, alkaline earth metal or mixed alkali metal-alkaline earth metal salts. For example, the preferred agents will include ethylenediaminetetraacetic acid, hydorxyethylenediaminetriacetic acid, diethylenetriaminepentaacetic acid and their salts. Special mention is made of ethylenediaminetetraacetic acid or a mono-, di-, tri- and tetrasodium salt thereof.

The preferred extracting liquid for use in the process of the invention is an aqueous solution of a lower alkanol, i.e., a misture of water and an alkanol having from 1 to 4 carbon atoms, such as methanol, ethanol, butanol, etc., or water soluble glycols such as ethylene glycol, 1,4-butanediol propylene glycol or glycerol having from 1–4 carbon atoms generally from 1 to 80% by volume of an alkanol or glycol may be employed. The continuous phase of the aqueous extracting liquid is formed by controlling the flow rates and insuring that there is an excess of aqueous phase to organic phase. These ratios may vary from 1.1 to 10:1 parts by volume of aqueous liquid extractant to discrete organic phase. A preferred ratio is 1.2 to 1:1 parts by volume of aqueous liquid extractant to discrete organic phase.

DESCRIPTION OF THE PREFERRED EMBODIMENTS

FIG. 1 of the drawings shows a diagram of an apparatus for carrying out the process of the invention. Through feed line 2 is passed a mixture of a poly(2,6-dimethyl-1,4-phenylene ether) reaction solution containing 16% polymer by weight, solvent, copper-amine catalyst, and aqueous trisodium ethylenediaminetetraacetic acid. In mixer 4, the feed is mixed with aqueous methanol that contains 50% by volume of methanol which is recycled through line 6 by a pump 8 which is connected to the lower portion of decanter 10 at lower outlet 11. The mixed feed from the mixer 4 is passed to the decanter 10 at inlet 12 where it is separated by gravity that causes liquid-liquid contact between the upward flowing light organic phase and the downward flowing heavy aqueous phase. The aqueous phase flow rate is maintained in excess of the organic phase as a continuous phase while the organic phase is kept as a discrete phase. At upper outlet 14, the organic polymer containing phase, which is substantially free of catalyst is withdrawn and passed to a polymer recovery step while at discharge outlet 16, a portion of the aqueous methanol containing the extracted catalyst is discharged from the decanter. Make-up quantities of fresh 50% aqueous methanol are added through inlet line 17.

Figure 2:
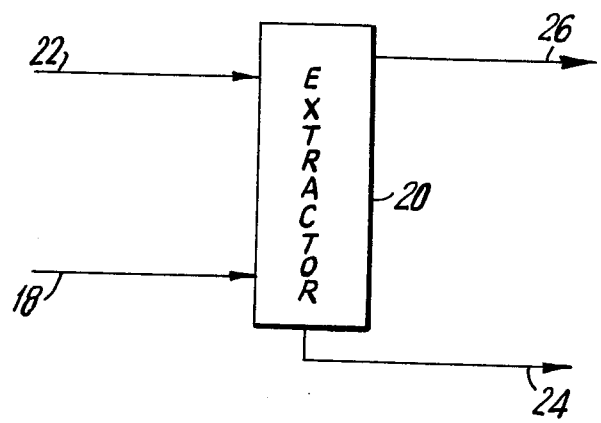
FIG. 2 is a diagram of an apparatus for carrying out the process of the invention in a stagewise manner.

FIG. 2 is a diagram of an apparatus for carrying out the process of the invention which is carried out in a stagewise manner. A mixture of a poly(2,6-dimethyl-1,4-phenylene ether) reaction solution containing 16% polymer by weight, solvent, copper-amine catalyst and aqueous trisodium ethylenediamine tetraacetic acid is fed through line 18 to column 20. An extracting liquid which consists of 50% by volume mixture of methanol and water is fed through line 22 to the top of column 20. The extracting liquid is fed at such a rate that a continuous aqueous phase is maintained in countercurrent liquid-liquid flow against a discrete organic-polymer containing phase. The aqueous extracting liquid which contains extracted catalyst is withdrawn from discharge outlet 24, while the organic polymer phase, which is substantially free of catalyst is withdrawn from upper outlet 26 and sent to a polymer separation processing stage.

The following experimental procedures were carried out to illustrate the present invention.

EXAMPLE 1

A polyphenylene ether reaction solution was prepared as follows:

To a 50 gallon reactor fitted with an agitator and oxygen dip tube was added 25.6 gallons of toluene containing 2.60 wt. % Di-n-butylamine (DBA), 1.615 liters of additional DBA and a catalyst solution consisting of 1514 ml methanol, 118.66 g $CuCl_2$ and 181.65 g of NaBr. While agitating at 400 RPM and bubbling $O_2$ through the mixture at 250 SCFH, 14.41 gallons of 53% by weight 2,6-xylenol solution in toluene was added over 30 minutes, with temperatures maintained at 104° F. by cooling with water. Catalyst molar ratio used was 250:1:2:30 2,6-xylenol to copper chloride to sodium bromide to DBA. Oxygen was ended at 80 minutes and the vessel was purged with nitrogen. A later determination of intrinsic viscosity of the polyphenylene oxide showed 0.54 dl/g. and the solids to constitute 10%.

To 300 ml of this polymer solution, was added 2.1 ml of a 38% ethylenediamine tetraacetic aqueous solution and 600 ml of a 50/50 water/methanol mixture (vol. fractions). This was blended for one minute using a Tekman homogenizer, then poured into a 1,000 ml graduated cylinder and placed in the 50° C. bath. The following observations were made:

| Time in Bath | Observation |
| --- | --- |
| 0 min. | The total volume was 870 ml due to transfer losses. |
| 2 min. | Definite decantation has occurred and a phase boundry (meniscus) has appeared at the 508 ml level separating the brownish light phase from the bluish heavy phase. The bluish color is indicative of the copper extracted from the polymer solution. |
| 15 min. | No great change from the 2 min. observation. |
| 40 min. | Same as for 15 min. except that the total volume level was reduced to 830 ml due to evaporation-the phase boundary remained at 580 ml. |

COMPARISON EXAMPLE A

To a 450 ml solution of a polymer solution, that was identical to the polymer solution of Example 1, was added 3.15 ml of a 38% aqueous ethylenediaminetetraacetic acid solution. This was blended for one minute using a Tekmar homogenizer, then poured into a 500 ml graduated cylinder and placed in a 50° C. bath. The following observations were made:

| Time in 50° C. Bath | Observation |
| --- | --- |
| 0 min. | no indication of decantation. |
| 10 min. | no indication of decantation. |
| 15 min. | no indication of decantation |
| 40 min. | some decantation seems apparent by blue color at bottom of cylinder but hardly measurable |

At the 15 and 40 minute intervals of Example 1 and Comparison Example A, 40 ml samples of the light phase were taken. These samples were centrifuged to separate the heavy phase droplets containing residual copper catalyst still remaining in these light phases which would have been "carry over" in a decantation process. In both experiments, there was no significant difference in the centrifuged heavy phase volume between the 15 minute and 40 minute samples which indicates that the amount of decanting occuring between 15 and 40 minutes is small.

In comparative Example A, the centrifuged heavy phase was about 0.4 ml per 40 ml of solution and was a very dark blue color indicating a very high copper content. In contrast, Example 1 had a heavy phase "carry over" of about 0.8 ml per 40 ml of solution that was somewhat yellowish in tint indicating that there was very little copper left.

An analysis of the two centrifuged heavy phases revealed that Example 1 had 165 ppm and that comparative Example A had 12,500 ppm of copper.

Obviously, other modifications and variations of the present invention are possible in light of the above teachings. It is, therefore, to be understood that changes may be made in the particular embodiments of the invention described which are within the full intended scope of the invention as defined by the appended claims.

We claim:

1. In a process for the liquid-liquid separation of a copper-amine catalyst from a polyphenylene ether resin organic reaction solution wherein a catalyst extracting agent is added to said polyphenylene ether organic reaction solution to form a mixture that includes polyphenylene ether resin, organic solvent and extractable copper-amine catalyst, the improvement which comprises:
   (a) extracting said mixture that includes polyphenylene ether resin, organic solvent and extractable copper-amine catalyst with an aqueous liquid extractant by cocurrent or countercurrent liquid-liquid extraction in an extractor in such a manner that a continuous aqueous phase is maintained and a discrete organic phase containing polyphenylene ether resin in solution is contacted by said continuous aqueous phase;
   (b) withdrawing from the upper part of said extractor an organic phase containing polyphenylene ether resin in solution that is substantially free of copper-amine catalyst; and
   (c) thereafter separating said polyphenylene ether resin from said organic phase to obtain polyphenylene ether resin that is substantially free of copper-amine catalyst.

2. The process of claim 1 wherein said polyphenylene ether resin is of the formula:

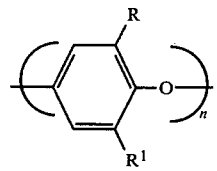

wherein the oxygen ether atom of one unit is connected to the benzene nucleus of the next adjoining unit, n is an integer of at least 50; and R and $R^1$ are monovalent substituents selected from hydrogen, halogen, hydrocarbon radicals, halohydrocarbon radicals having at least two carbon atoms between the halogen atoms and the phenyl nucleus, hydrocarbonoxy and halohydrocarbonoxy radicals having at least two carbon atoms, between the halogen atom and the phenyl nucleus.

3. The process of claim 2 wherein said polyphenylene ether is poly(2,6-dimethyl-1,4-phenylene ether).

4. The process of claim 1 wherein the extractant is selected from the group consisting of sulfuric acid, hydrochloric acid, acetic acid, ammonium salts, bisulfate salts, and chelating agents.

5. The process of claim 1 wherein the aqueous liquid employed for liquid-liquid countercurrent extraction includes a member of the group consisting of lower alkanols and glycols having 1-4 carbon atoms.

6. The process of claim 1 wherein the ratio of aqueous liquid extractant to discrete organic phase is from 1.1 to 10:1 parts by volume.

7. The process of claim 1 wherein the aqueous extracted copper-amine catalyst is withdrawn from the lower portion of the extractor.

8. The process of claim 7 wherein a portion of the aqueous extracted copper-amine catalyst is recycled to the mixture that includes polyphenylene ether resin, organic solvent and extractable copper-amine catalyst.

9. In a process for the liquid-liquid separation of a copper-amine catalyst from a poly(2,6-dimethyl-1,4-phenylene ether) organic reaction solution wherein an aqueous chelating agent is added to said poly(2,6-dimethyl-1,4-phenylene ether) reaction solution to form a mixture that includes poly(2,6-dimethyl-1,4-phenylene ether) organic solvent and chelated copper-amine catalyst, the improvement which comprises:
   (a) extracting said mixture that includes poly(2,6-dimethyl-1,4-phenylene ether) resin, organic solvent and chelated copper-amine catalyst with an aqueous solution of a lower alkanol by liquid-liquid extraction in an extractor in such a manner that a continuous aqueous phase is maintained and a discrete organic phase containing polyphenylene ether resin in solution is contacted by said continuous aqueous phase;
   (b) withdrawing from the upper part of the extractor an organic phase containing poly(2,6-dimethyl-1,4-phenylene ether) resin in solution that is substantially free of copper-amine catalyst; and
   (c) thereafter separating said poly(2,6-dimethyl-1,4-phenylene ether) resin from said organic phase to obtain poly(2,6-dimethyl-1,4-phenylene ether) resin that is substantially free of copper-amine catalyst.

10. The process of claim 9 wherein a phase ratio of the aqueous solution of a lower alkanol to the organic phase is 1.2:1.

11. The process of claim 10 wherein the aqueous solution of a lower alkanol is 50% by volume of methanol in water.

* * * * *

UNITED STATES PATENT AND TRADEMARK OFFICE
CERTIFICATE OF CORRECTION

PATENT NO. : 4,237,265

DATED : December 2, 1980

INVENTOR(S) : John D. Eliassen, Gim Fun Lee, Jr. and James Watson, Jr.

It is certified that error appears in the above—identified patent and that said Letters Patent is hereby corrected as shown below:

In Column 3, line 24 "hydorxyethylene" should read --hydroxyethylene--;

In Column 3, line 31, "misture" should read --mixture--;

In Column 4, line 56, "508" should read --580--.

Signed and Sealed this

Eighteenth Day of August 1981

[SEAL]

Attest:

GERALD J. MOSSINGHOFF

Attesting Officer

Commissioner of Patents and Trademarks